United States Patent
Wigren

(10) Patent No.: US 8,768,378 B2
(45) Date of Patent: Jul. 1, 2014

(54) METHOD AND ARRANGEMENT FOR IMPROVED POSITIONING

(75) Inventor: Karl Torbjörn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 55 days.

(21) Appl. No.: 13/499,237

(22) PCT Filed: Oct. 12, 2009

(86) PCT No.: PCT/EP2009/063272
§ 371 (c)(1),
(2), (4) Date: Mar. 29, 2012

(87) PCT Pub. No.: WO2011/044924
PCT Pub. Date: Apr. 21, 2011

(65) Prior Publication Data
US 2012/0282946 A1    Nov. 8, 2012

(51) Int. Cl.
H04W 24/00    (2009.01)

(52) U.S. Cl.
USPC ........................................ 455/456.1

(58) Field of Classification Search
USPC ............... 455/456.1–456.6, 404.2, 446, 448, 455/422.1
See application file for complete search history.

(56) References Cited

U.S. PATENT DOCUMENTS

| | | | | |
|---|---|---|---|---|
| 2002/0151313 A1* | 10/2002 | Stead | ............................ | 455/456 |
| 2008/0039114 A1* | 2/2008 | Phatak et al. | .............. | 455/456.1 |
| 2011/0319097 A1* | 12/2011 | Wirola et al. | .............. | 455/456.1 |

FOREIGN PATENT DOCUMENTS

| | | |
|---|---|---|
| CN | 101536591 A | 9/2009 |
| CN | 101536593 A | 9/2009 |
| WO | WO 2007/043915 A1 | 4/2007 |
| WO | WO 2008/054272 A1 | 5/2008 |

OTHER PUBLICATIONS

R. Chang et al.; "Legible Simplification of Textured Urban Models" IEEE Computer Graphics and Applications, IEEE Service center, NY, NY, US, vol. 28, No. 3, May 1, 2008, pp. 27-36, XP011208291, ISSN: 0272-1716 DD 29-31" figure 6.*
International Search Report, PCT Application No. PCT/EP2009/063272, mailed Jun. 30, 2010.

(Continued)

*Primary Examiner* — Brandon Miller
(74) *Attorney, Agent, or Firm* — Myers Bigel Sibley & Sajovec, PA

(57) ABSTRACT

A method of enabling reporting of high precision position determination data in a cellular communication system includes detecting two different cell polygons, each representative of a geographical location of a respective cluster of high precision position determinations in response to a positioning request, joining the two different cell polygons to form a merged cell polygon by selectively joining a respective outer perimeter of each of the polygons to minimize a resulting merged cell polygon area while maintaining a number of corners of the merged cell polygon below a predetermined threshold, and reporting the merged cell polygon to a network node to provide position determination data originating from the two different cell polygons as the single merged cell polygon.

13 Claims, 15 Drawing Sheets

(56) References Cited

OTHER PUBLICATIONS

T. Wigren; "Adaptive Enhanced Cell-ID Fingerprinting Localization by Clustering of Precise Position Measurements" IEEE Transactions on vehicular technology, IEEE Service Center, Piscataway, NJ, US LNKD-DOI:10.1109/TVT.2007.900400, vol. 56, No. 5, Sep. 1, 2007, pp. 3199-3209, XP011192659.

R. Chang et al.; "Legible Simplification of Textured Urban Models" IEEE Computer Graphics and Applications, IEEE Service center, NY, NY, US, vol. 28, No. 3, May 1, 2008, pp. 27-36, XP011208291, ISSN: 0272-1716 pp. 29-31; figure 6.

A. K. Das et al.; "A Cluster-Merge Algorithm for Solving the Minimum Power Broadcast Problem in Large Scale Wireless Networks" 2003 IEEE Military Communications Conference. MILCOM 2003. Boston, MA, Oct. 13-16, 2003; NY, NY: IEEE, US LNKD-DOI: 10.1109/MILCOM.2003. 1290139, vol. 1, Oct. 13, 2003, pp. 416-421, XP010698343; ISBN: 978-0-7803-8140-7.

Chinese Search Report Corresponding to Chinese Application No. 200980161965.6; Dated: Jun. 20, 2013; 2 pages.

* cited by examiner

| 8 | 7 | 6 | 5 | 4 | 3 | 2 | 1 | |
|---|---|---|---|---|---|---|---|---|
| 0 | 1 | 0 | 1 | \multicolumn{4}{c|}{Number of points} | Octet 1 |

| | |
|---|---|
| S1 | Octet 2 |
| Degrees of latitude of point 1 | Octet 3 |
|  | Octet 4 |
| Degrees of longitude of point 1 | Octet 5 |
|  | Octet 6 |
|  | Octet 7 |
| ... | |
| Sn | Octet 6n-4 |
| Degrees of latitude of point n | Octet 6n-3 |
|  | Octet 6n-2 |
| Degrees of longitude of point n | Octet 6n-1 |
|  | Octet 6n |
|  | Octet 6n+1 |

FIG8 — ASSIGN THE ENCLOSING POLYGON AS A MERGED POLYGON — FIG8

Fig. 10

FIG8 — TRAVERSING ONE OF SAID POLYGONS, ADDING INTERSECTIONS, TRAVERSING SECOND POLYGON, ADDING INTERSECTIONS, REPEATING UNTIL INITIAL CORNER IS REACHED, TO FORM MERGED POLYGON — FIG8

METHOD AND ARRANGEMENT FOR IMPROVED POSITIONING

CROSS REFERENCE TO RELATED APPLICATIONS

This application is a 35 U.S.C. §371 national stage application of PCT International Application No. PCT/EP2009/063272, filed on 12 Oct. 2009, the disclosure and content of which is incorporated by reference herein in its entirety. The above-referenced PCT International Application was published in the English language as International Publication No. WO 2011/044924 A1 on 21 Apr. 2011.

TECHNICAL FIELD

The present invention relates to positioning in telecommunication systems in general and in particular to improved reporting in response to positioning requests in such systems.

BACKGROUND

All cellular systems are divided into cells, served by one specific base station. Each base station may serve more than one cell. The important point from a positioning and navigation perspective is that the cell where a specific UE (User Equipment=terminal=cellular phone) is located is known in the cellular system. Hence, after determination of the geographical area covered by a specific cell, it can be stated that the UE is located somewhere within said geographical area, as long as it is connected and the reported cell identity of the serving cell is equal to the cell identity of the particular geographical area.

In several systems, among these the WCDMA (Wideband Code Division Multiple Access) system, the preferred representation of the geographical extension of the cell is given by the so called cell polygon format [1]. The geographical extension and position of a cell is described by 3-15 corners of a closed polygon, which does not intersect itself. The format is two-dimensional and the corners are determined as pairs of longitudes and latitudes in the WGS84 geographical reference system, see [1] for details.

The cell identity positioning method operates as follows (the description is done for the WCDMA cellular system, assuming that the positioning operates over the RANAP interface [2]. The procedures are similar for GSM and control plane LTE.

1) The message LOCATION REPORTING CONTROL is received in a SRNC (Serving Radio Network Controller) over the RANAP interface [2].

2) The quality of service parameters (most importantly accuracy and response time) of the LOCATION REPORTING CONTROL message is such that the RNC selects the cell identity positioning method.

3) The SRNC determines the serving cell identity of the positioned UE (special procedures may apply in case the UE is in soft(er) handover with multiple base stations), and retrieves a pre-stored polygon that represents the extension of the serving cell.

4) The SRNC sends the resulting cell polygon back to the core network over the RANAP interface [2], using the cell polygon format in a LOCATION REPORT message.

As stated above, the preferred representation of the geographical extension of the cell is given by the cell polygon format [1]. FIG. 1 represents an example of a cell polygon with corners A-E. The NodeB (RBS, Radio Base Station) is normally located close to one of the corners of the cell polygon said NodeB serves. The 3GPP Polygon message IE (Information Element) in FIG. 2 is present in the LOCATION REPORT message that is returned to the core network over the RANAP interface after a successful cell identity positioning.

It should be noted that due to the complexity of the radio propagation the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in the cell-planning tool to represent the cell extension with a certain confidence. The confidence is the probability that the terminal is actually located within the reported region, in this case bounded by the cell polygon.

So-called Assisted GPS (A-GPS) positioning is an enhancement of the global positioning system (GPS). An example of an A-GPS positioning system is displayed in FIG. 3. There GPS reference receivers attached to a cellular communication system collect assistance data that, when transmitted to GPS receivers in terminals connected to the cellular communication system, enhance the performance of the GPS terminal receivers. Typically, A-GPS accuracy can become as good as 10 meters also without differential operation. The accuracy becomes worse in dense urban areas and indoors, where the sensitivity is most often not high enough for detection of the very weak signals from the GPS satellites.

Another positioning approach is provided by so called fingerprinting positioning [3], which operates by creating a radio fingerprint for each point of a fine coordinate grid that covers the Radio Access Network (RAN). The fingerprint may e.g. consist of i) The cell Ids that are detected by the terminal, in each grid point.

ii) Quantized path loss or signal strength measurements, wrt multiple NodeBs, performed by the terminal, in each grid point. Note, an associated ID of the NodeB may also be needed.

iii) Quantized round trip time (RTT), in each grid point. Note, an associated ID of the NodeB may also be needed.

iv) Radio connection information like the radio access bearer (RAB).

Whenever a position request arrives to the positioning method, a radio fingerprint is first measured, after which the corresponding grid point is looked up and reported. This of course requires that the point is unique. The database of fingerprinted positions (the radio map) can be generated in several ways. A first alternative would be to perform an extensive surveying operation that performs fingerprinting radio measurements repeatedly for all coordinate grid points of the RAN. The disadvantages of this approach include:

The surveying required becomes substantial also for small cellular networks.

The radio fingerprints are in some instants (e.g. signal strength and path loss) sensitive to the orientation of the terminal, a fact that is particularly troublesome for handheld terminals. For fine grids, the accuracies of the fingerprinted positions therefore become highly uncertain, which is unfortunately seldom reflected in the accuracy of the reported geographical result.

Another approach is to replace the fine grid by high precision position measurements of opportunity, and to provide fingerprinting radio measurements for said points. This avoids the above drawbacks, however Algorithms for clustering of high precision position measurements of opportunity needs to be defined.

Algorithms for computation of geographical descriptions of the clusters need to be defined.

The above two problems are solved by prior art in relation to the AECID positioning method, see [3].

One particular form of fingerprinting is the so-called AECID fingerprinting positioning method, one of the first steps of which is to collect tagged high precision reference measurements, e.g. obtained by A-GPS measurements and tagging with measured radio conditions, in clusters where all high precision measurements have the same tag. This creates clusters of tagged high precision measurements, like the one shown in FIG. 4. The picture shows a simulated cluster of high precision reference positions. Each dot represents one high precision (A-GPS) measurement. All high precision measurements have the same tag.

Previous patent applications and [3] describe how a polygon can be computed, to describe the boundary of the cluster of high precision measurements shown in FIG. 4.

SUMMARY

The present invention relates to improved positioning in a telecommunication system.

In particular, the present invention discloses a method of improved reporting of positioning data.

Basically, the present invention discloses enabling improved reporting of high precision position determination data in a cellular communication system, by in response to a positioning request detecting (S10) two different cell polygons, each representative of a geographical location of a respective cluster of high precision position determinations. Subsequently, joining (S20) the two different cell polygons to form a merged cell polygon, by selectively joining a respective outer perimeter of each said polygon in order to minimize a resulting merged cell polygon area and maintaining the number of corners of said merged cell polygon below a predetermined threshold. Finally, reporting (S30) the merged cell polygon to a network node, thereby providing position determination data originating from two different cell polygons in a single merged cell polygon.

Advantages
  Improved positioning
  Improved reporting of positioning data

BRIEF DESCRIPTION OF THE DRAWINGS

The invention, together with further objects and advantages thereof, may best be understood by referring to the following description taken together with the accompanying drawings, in which:

FIG. 2 is an example of a polygon reporting format,

FIG. 9 is a flow chart of another embodiment of a method according to the present invention, FIG. 10 a flow chart of another embodiment of a method according to the present invention, FIG. 11 a flow chart of another embodiment of a method according to the present invention, FIG. 12 a flow chart of another embodiment of a method according to the present invention, FIG. 13$a$-$f$ is an illustration of polygon merging according to the present invention.

ABBREVIATIONS

AECID Adaptive Enhanced Cell ID
A-GPS Assisted GPS
CN Core Network
GSM Global System for Mobile Communications
LTE Long Time Evolution
RAB Radio Access Bearer
RAN Radio Access Network
RANAP Radio Access Network Application Part
RNC Radio Network Controller
RRC Radio Resource Control
RRM Radio Resource Management
SRNC Serving Radio Network Controller
TA Timing Advance
TDOA Time Difference Of Arrival
TOA Time Of Arrival
UE User Equipment
WCDMA Wideband Code Division Multiple Access

DETAILED DESCRIPTION

The present invention will be described in the context of fingerprint positioning e.g. A-GPS in a WCDMA system, but is equally applicable to similar systems where such positioning is utilized.

Figure 1:
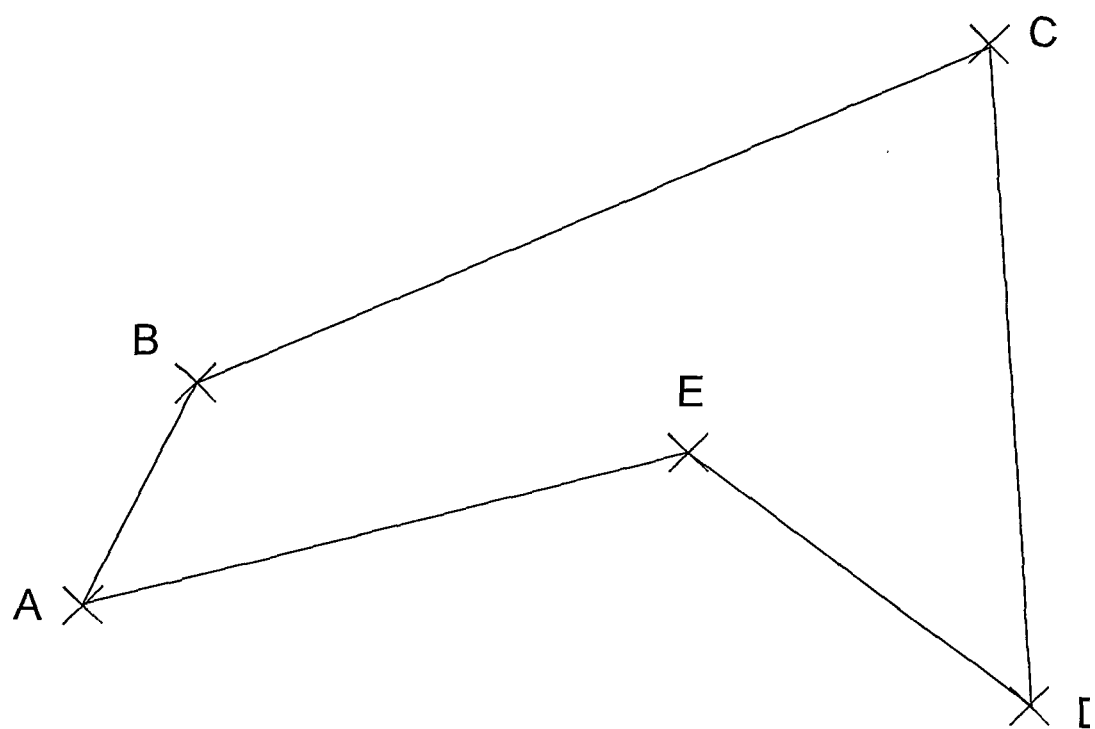
FIG. 1 is a schematic illustration of a cell polygon.
Figure 3:
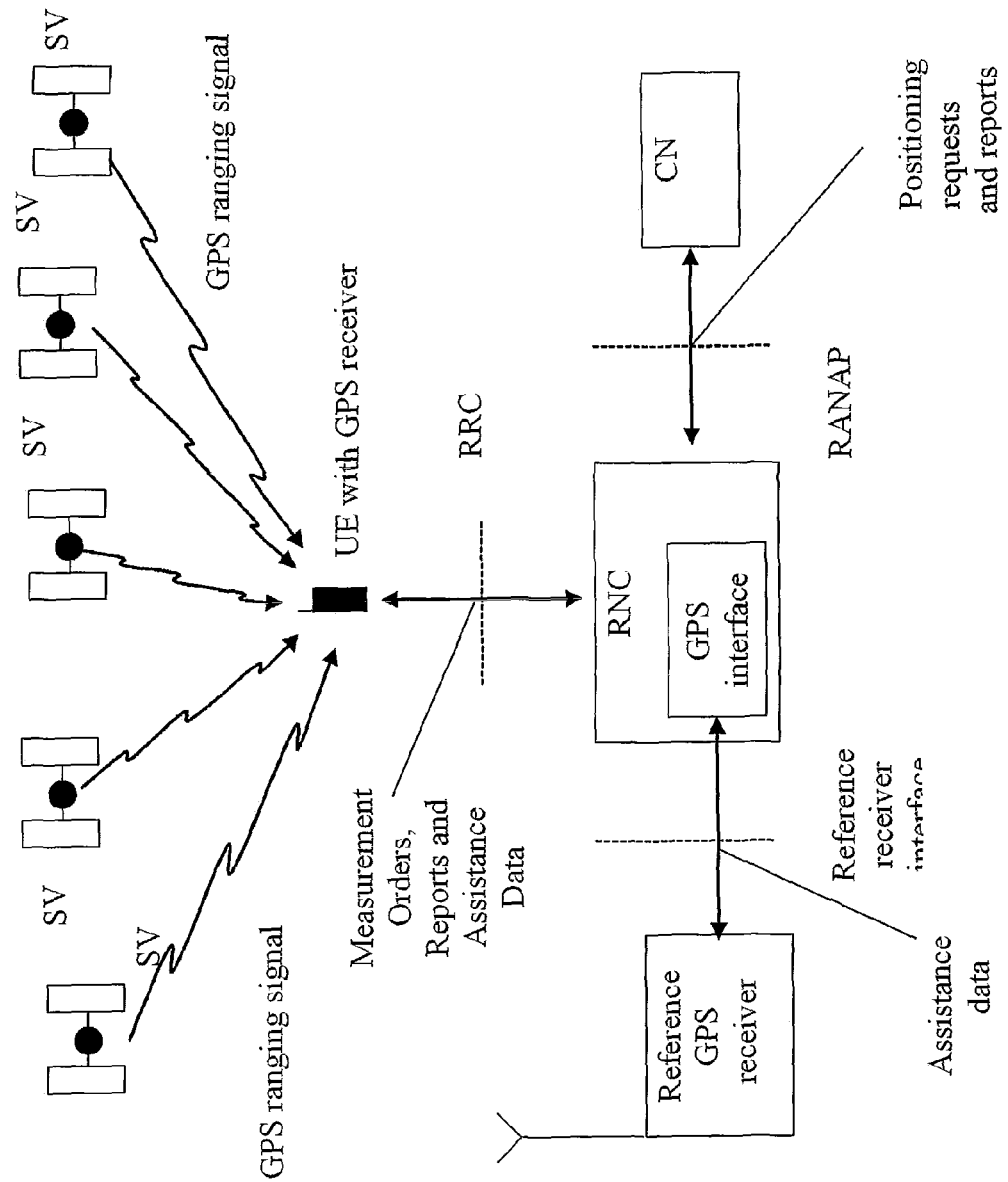
FIG. 3 is an example of A-GPS.
Figure 4:
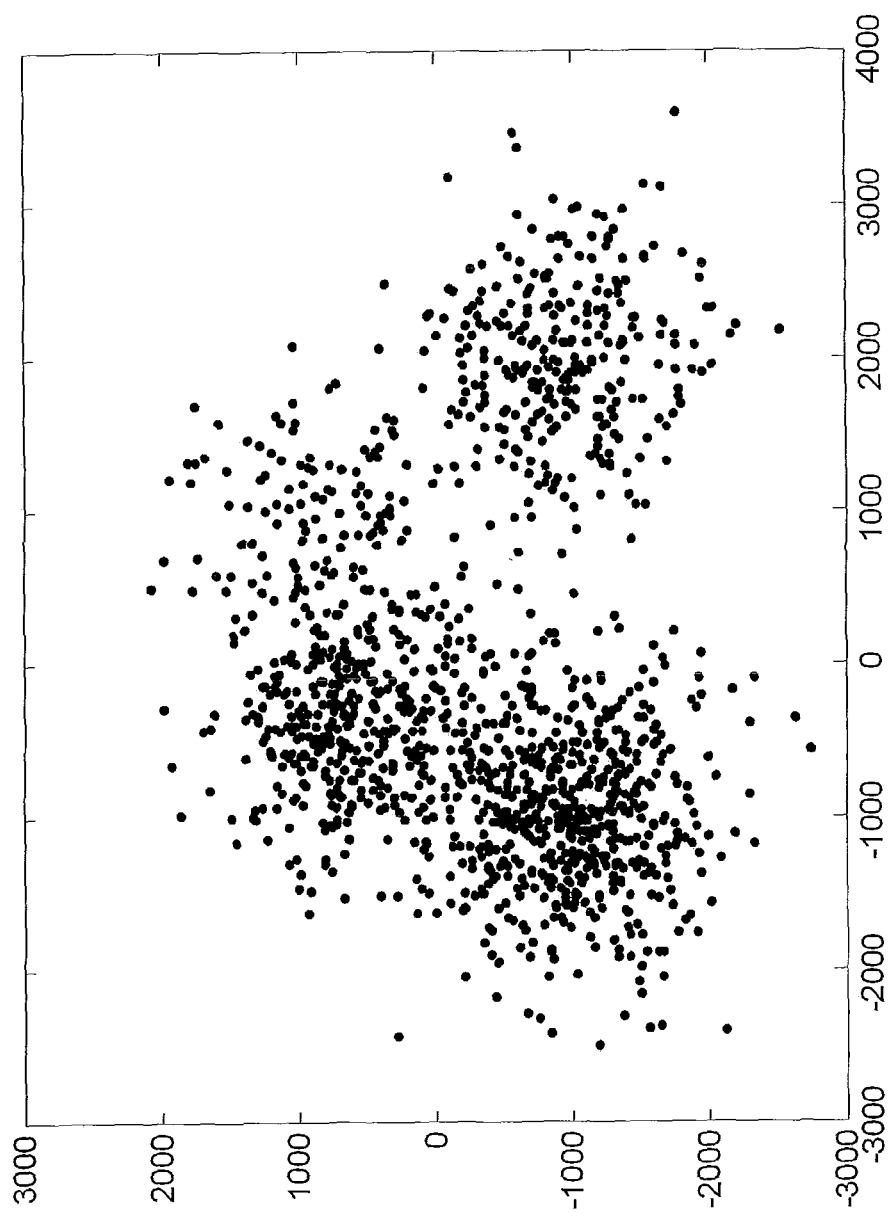
FIG. 4 is an illustration of clusters of high precision measurements.

A further study of the cluster in FIG. 4 reveals that it is probably composed of two sub-clusters, with an overlapping region in between. Since there are only a maximum of 15 corners to distribute for the contracting polygon algorithm of [3], it follows that it will be easier for that algorithm to obtain an accurate description of the cluster of FIG. 4 if:

The cluster of FIG. 4 is first split into sub-clusters. As shown below, in FIG. 5, the geometrical shape of each sub-cluster then becomes more circular, a fact that simplifies for the algorithm of [3], which thereby can obtain polygons for each sub-cluster that provide a more accurate description of the total cluster than if said cluster would be processed in one step by said contracting polygon algorithm.

Reporting of the sub-clusters, to the end user.

Figure 5:
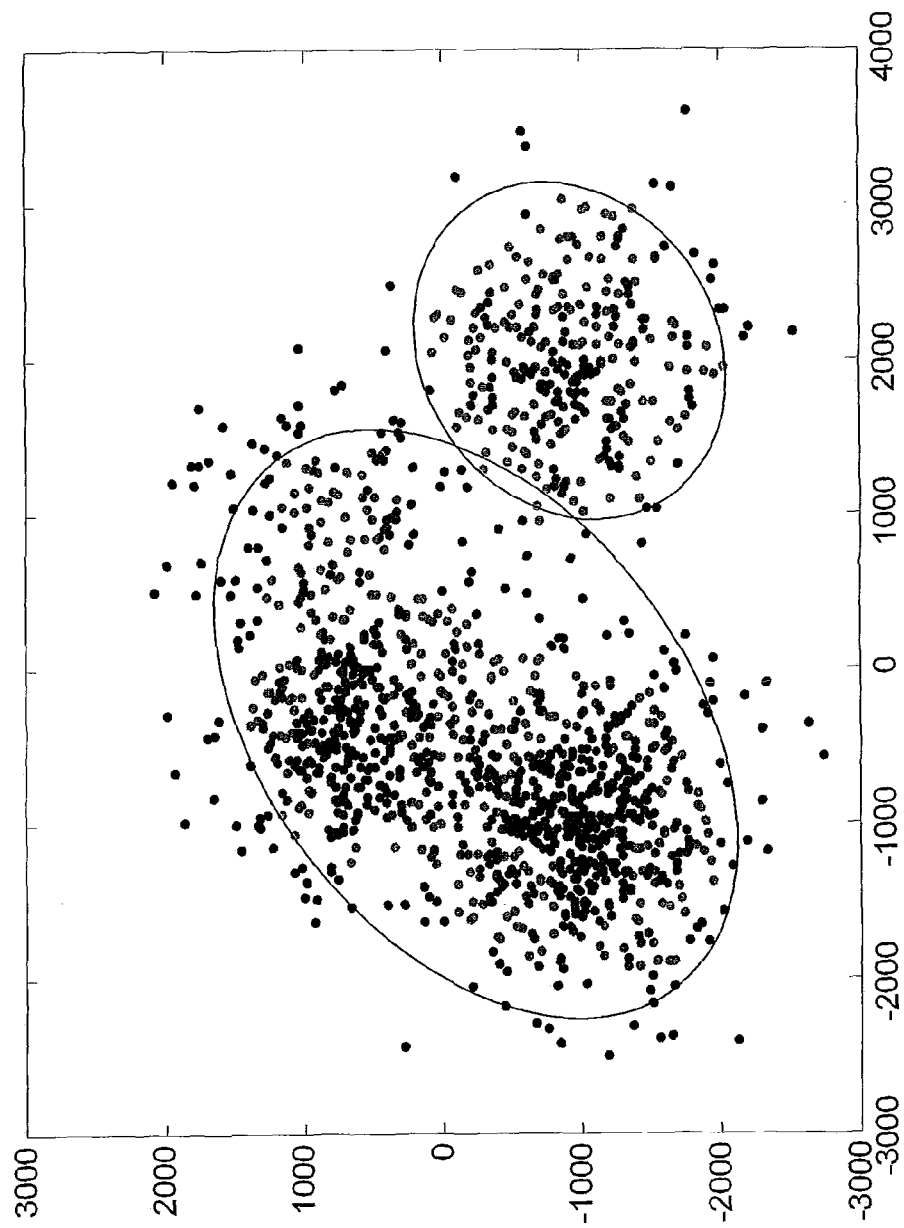
FIG. 5 is an illustration of sub-clusters from FIG. 5.

Automatic algorithms for splitting of a cluster in sub-clusters are disclosed in the international patent application [4]. The effect of applying these algorithms to the cluster of FIG. 4 is depicted in FIG. 5. The resulting clusters are indicated by the two ellipses.

Figure 6:
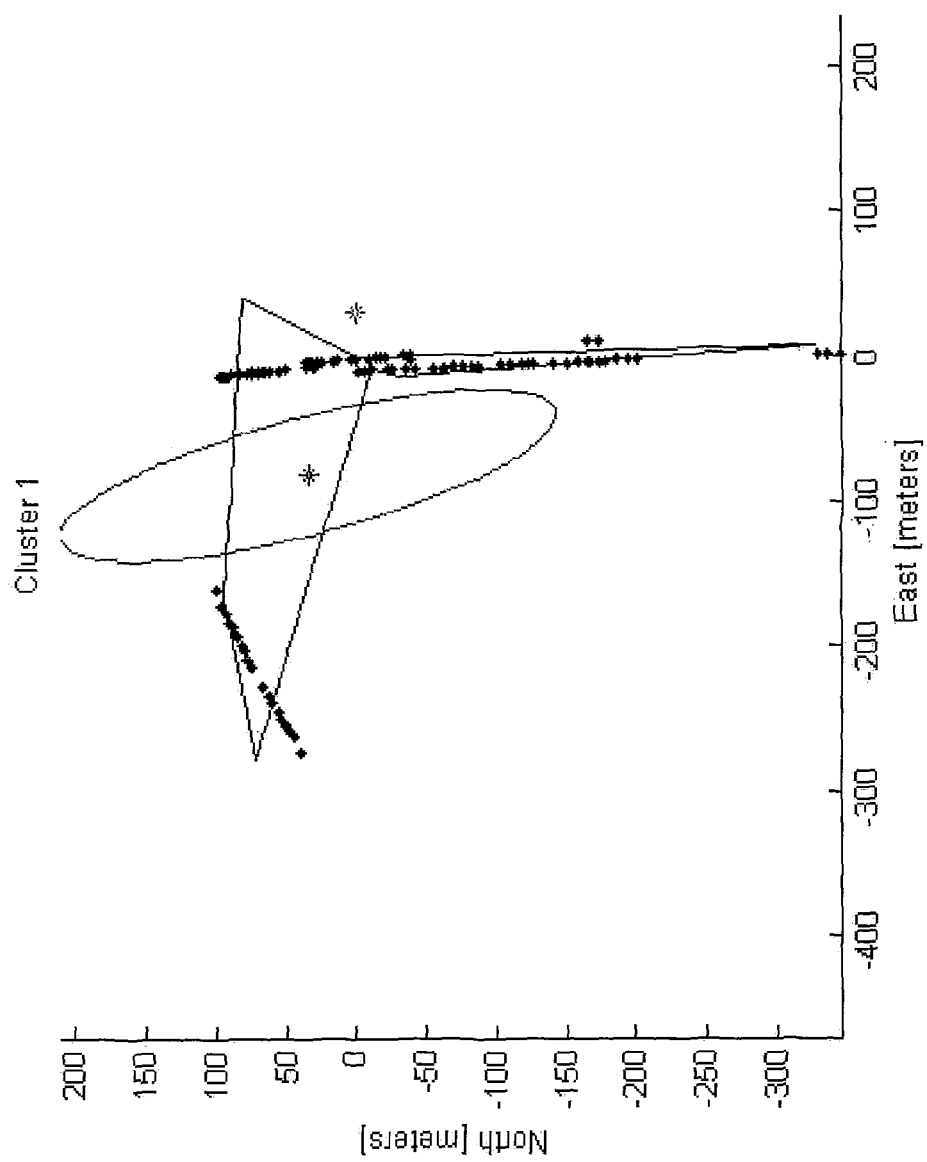
FIG. 6 is a schematic illustration of a problem with prior art

One particular example of utilizing the above described cluster splitting is further illustrated in FIG. 6. The situation where clusters used for AECID processing would benefit from splitting occurs frequently in practice. It is e.g. common that reference A-GPS measurements of said clusters are collected along streets in urban regions. This leads to a situation where clusters are divided in disjoint parts as shown in FIG. 6. Unless these clusters are split before a polygon is computed to describe the boundary, the polygon will cover an unnecessarily large area, thereby significantly reducing the accuracy of the AECID positioning method.

At present there are no means or methods available for reporting two such sub-clusters in response to a single positioning request, thus severely limiting the usefulness of cluster splitting and resulting in a less accurate positioning for some cases.

The present invention will be described with relation to the problems of the above-mentioned cluster splitting scenario. However, there are additional scenarios where multiple clusters (as represented by their respective calculated polygons) need to be merged in order to enable reporting and where the present invention would provide beneficial enhancement. One such scenario is where more coarse altitude information is requested. Another example is where the polygons are unnecessarily fine. A further scenario is where an operator or authority wants to merge several polygons in order to create margins during e.g. search and rescue missions.

The present invention is particularly suitable for WCDMA, LTE and GSM, in particular for enhancing AECID fingerprinting algorithms in combination with cluster splitting.

In prior art, cluster splitting could not be exploited by the AECID algorithm, simply because the reporting interfaces from the positioning node of WCDMA and LTE only support reporting of one polygon for each positioning request. Consequently, in order to further exploit the cluster splitting algorithms, the inventor has identified a need to find a solution on how to avoid reporting multiple polygons in response to one positioning request.

The present disclosure aims to provide means and methods to merge two such polygons (or any two polygons representative of high precision position determinations) into a single polygon and report the single polygon in response to a single positioning request.

Figure 7:
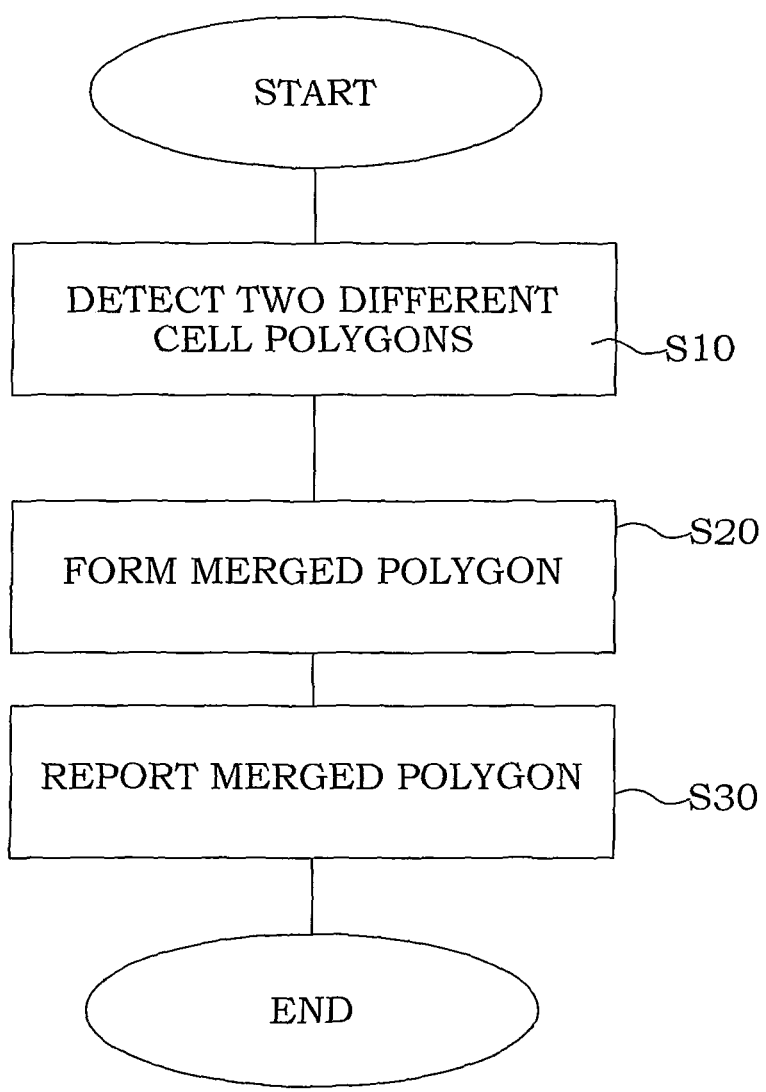
FIG. 7 is a flow chart of an embodiment of a method according to the present invention.

As a most basic embodiment, with reference to FIG. 7, the present invention comprises detecting two different polygons S10. Each such polygon represents a geographical location of a cluster of high precision position determinations for a user terminal. The polygons can be a result of a cluster splitting algorithm, or just represent any two polygons with or without a common denominator. The term detecting is used in its broadest sense, thus including actually detecting two polygons, receiving two polygons, calculating two polygons, or the like.

Subsequently, in order to enable reporting the two polygons as one, the two polygons are joined S20, combined, merged, or fused into a single merged cell polygon. In essence, the boundary of each polygon is selectively joined or combined with the boundary of the other polygon. Finally, the merged cell polygon is reported S30 to a network node. In this disclosure, the term join is used in a fairly general manner, thus including actually combining the boundaries of the two polygons as well as selecting one of the polygons to represent both polygons. This will be further described with relation to specific embodiments.

Consequently, the high precision position measurements originating from two different clusters e.g. from a cluster splitting algorithm, or any two polygons representative of the geographical location of a user terminal, can be reported using only a single polygon.

Since two polygons can be arranged relative to each other in a plurality of different ways, it is important to properly define their relation to each other in order to decide what method of joining or merging to use. The two polygons can be arranged according to one of two main categories, either the polygons are fully disjoint or they are overlapping to some extent.

As a general idea, if the polygons are non-overlapping e.g. fully disjoint, their respective boundaries need to be connected to form a joint boundary of a single merged cell polygon. At the same time, if the polygons originate from a cluster splitting algorithm, it is necessary to minimize the area that might be added to the combination. In other words, the respective borders need to be selectively joined in such a manner that area is not added unnecessarily by the proposed merging procedures.

For the case of overlapping polygons, the situation is somewhat more complex. The term overlapping is used in its broadest sense, thus including both the case where the two polygons are arranged on top of each other, potentially placing one polygon entirely within the other, and the case where the polygons are only partly overlapping, and either merely intersecting each other or with corners actually located within the interior of each other. The case of partially overlapping polygons can also be defined in terms of having polygons where line segments from the respective polygons intersect each other.

Figure 8:
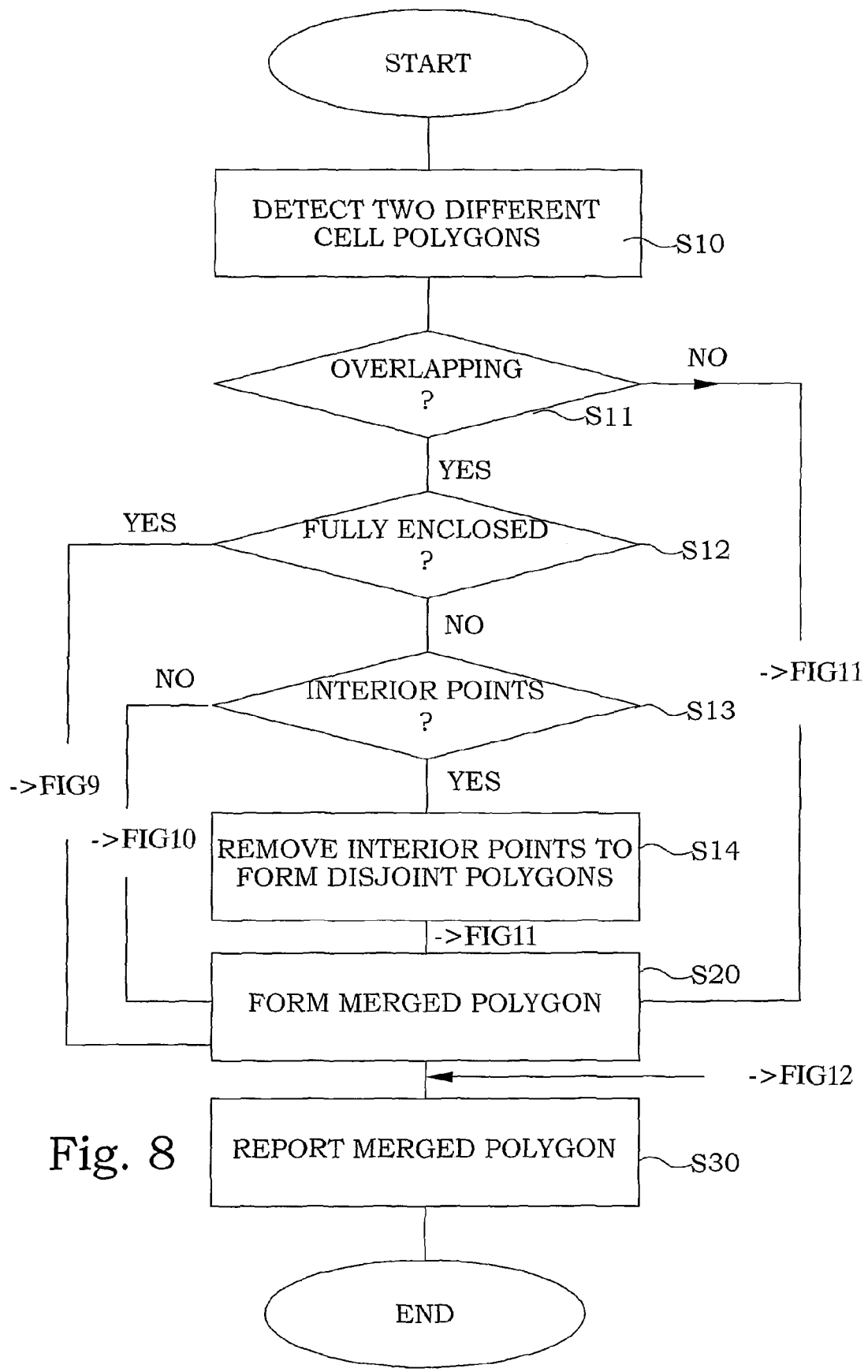
FIG. 8 is a flow chart of a further embodiment of a method according to the present invention.

With reference to FIG. 8, a further embodiment of a method according to the present invention will be described. As previously stated with relation to FIG. 7, two different cell polygons are detected in step S10. Subsequently, a step of determining if the polygons are overlapping S11 is performed. If the polygons are disjoint the method proceeds to the step of joining the two polygons to form a merged polygon in step S20, and subsequently reporting the merged polygon S30.

Figure 11:
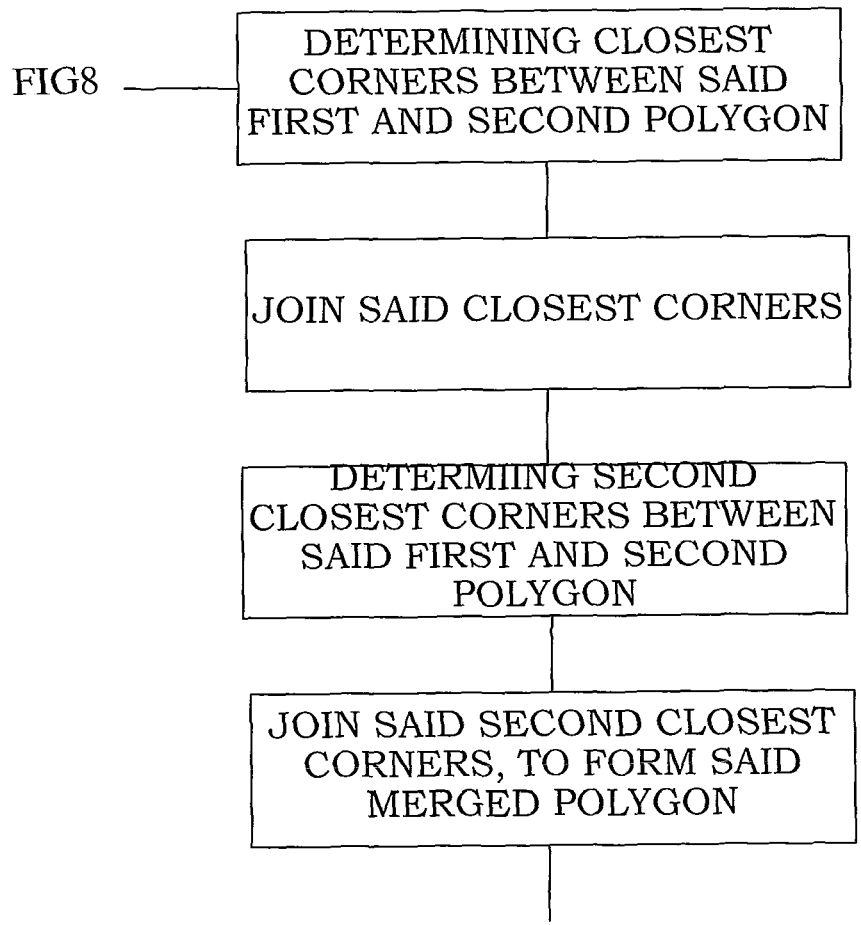

According to a particular embodiment, with reference to FIG. 11, if the polygons are determined to be disjoint i.e. neither intersecting nor overlapping each other, the joining step S20 is configured as follows. Basically, for each of the corners of the two polygons, determining which corners are closest together. In other words, comparing each corner from each polygon to each corner of the other polygon and typically finding which two pairs of corners of each polygon that are geographically closest together. When those corners are identified, they are connected to each other to form a single joint boundary e.g. non intersecting boundary of the merged cell polygon. The corners are preferably selected to minimize the area added by the joining operation. After the merged cell polygon is formed, with reference to FIG. 12, a check is performed as to determine if the number of corners of the merged cell polygon exceeds a predetermined threshold e.g. 15 corners. If such is the case, an operation of reducing the number of corners until the threshold is met is performed before the merged polygon with reduced number of corners is reported in step S30.

If the step S11 identifies the polygons as being overlapping, the method proceeds to a step of determining S12 if one of the polygons is contained within the interior of the other polygon e.g. if one of the polygons fully encloses the other. If such is the case, the step of joining S20 the two polygons continues as depicted in FIG. 9, by assigning the enclosing polygon as the merged polygon and reporting S30 the enclosing or outer polygon to a network node. The case of enclosing polygons is most likely to appear when the positioning measurements include altitude parameters. Then it is very likely that a cluster can be divided into one sub cluster representing the peak of a mountain and one sub cluster representing the valley surrounding the mountain.

If step S12 reveals that the two polygons are only partially overlapping, a next step S13 determines if any corners of one polygon are contained within the boundary of the other polygon e.g. if a corner of one polygon forms an interior point of the other polygon. If such is the case, then according to a particular embodiment, the interior point, or points need to be removed S14 from the respective polygon to form two disjoint polygons. Subsequently, the procedure for disjoint polygons is performed as described with relation to FIG. 11 and FIG. 12. Alternatively, instead the union of the two polygons is formed and the now combined joint border is selected to be the merged cell polygon. Any interior line segments and interior points are thereby removed, new corners are added at the points where the two polygons intersect. Subsequently, a check is performed to see if the number of corners exceeds the set threshold e.g. 15 corners. In that case the number of corners is reduced until said threshold is met.

Figure 12:
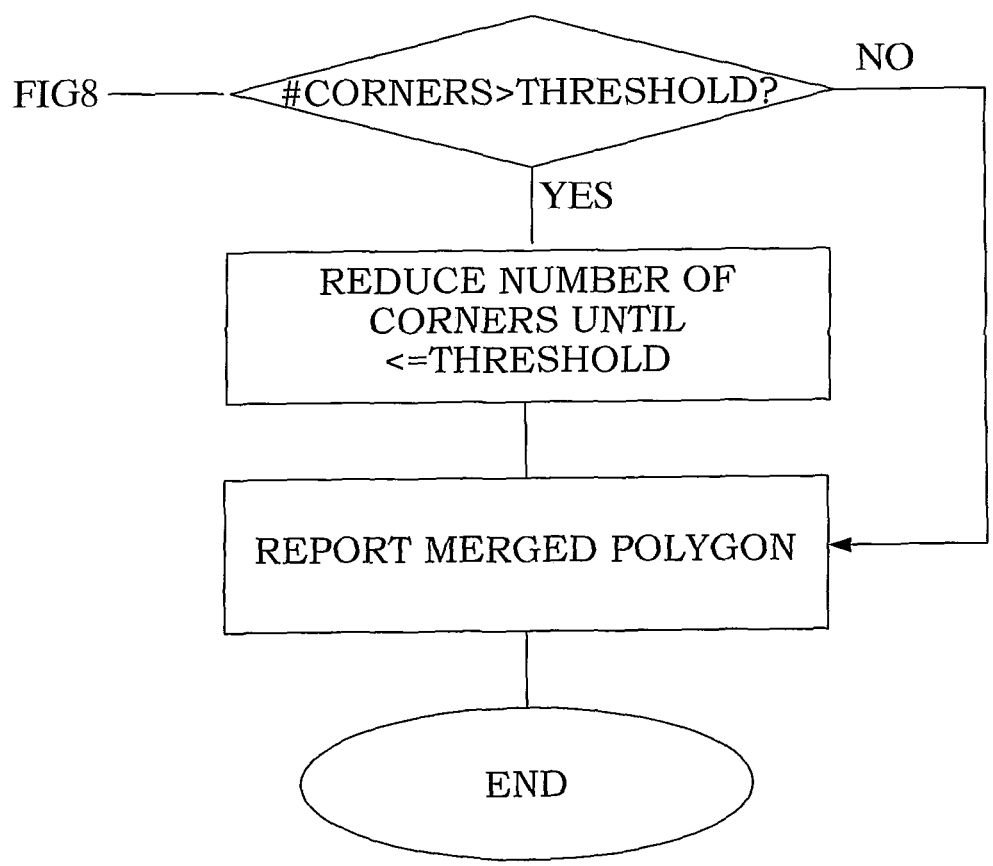

If no interior points are present in the overlapping polygons, the process of joining the two polygons into the merged polygon follows the flow outlined in FIG. 10. Basically, the union of the two polygons is formed and the outer perimeter of the union is assigned to be the joint boundary of the merged polygon with corners added at each intersection. Specifically, by traversing the perimeter of one polygon, adding intersection and corners as new corners, traversing the other polygon, adding intersections and corners, and repeating until initial corner is reached to form the merged polygon. Finally, the check according to FIG. 12 is performed to ensure that the merged polygon conforms with the requirement of a threshold value for the number of allowable polygons corners.

In a summary manner the present disclosure/invention comprises
a) Enabling of reporting of polygon information from a positioning node to another node, over a communication interface adapted for reporting of one polygon, said reported polygon being obtained from at least two polygons, said at least two polygons being computed from independent clusters of high precision reference points.
b) Fusion (merging) of at least two sub-clusters of high precision reference points, said sub-clusters being created for AECID positioning [3], obtained by cluster splitting according to [4], and by application of the contracting polygon algorithm [3], individually to each of said sub-clusters, said fusion algorithms
c) Merging (1) geographically non-overlapping polygons of sub-clusters, to one polygon, representing all or a subset of said sub-clusters
d) Merging (2) overlapping polygons of sub-clusters, to one polygon, representing all or a sub-set of said sub-clusters, said merging (2) algorithms
e) Handling situations where at least one corner of at least one polygon of a sub-cluster, is interior to at least one other polygon of said sub-clusters, originating from said one cluster representing a tag of the AECID algorithm.
f) Handling situation where no corner of a polygon of a sub-cluster, is interior to a polygon of said sub-clusters, said sub-clusters originating from said one cluster representing a tag of the AECID algorithm.
g) Reduction of the number of corners of the resulting fused polygon, representing the original cluster, in case the number of corners of said fused corner would exceed a pre-specified maximum number (15), said reduction algorithm accounting for the shape of said fused polygon and minimizing the accuracy impairment associated with said reduction of the number of corners.

To further explain the present invention a few specific embodiments and examples of the present invention, with reference to FIGS. 13a-13f and with some detailed calculations, will follow below.

Figure 13A:
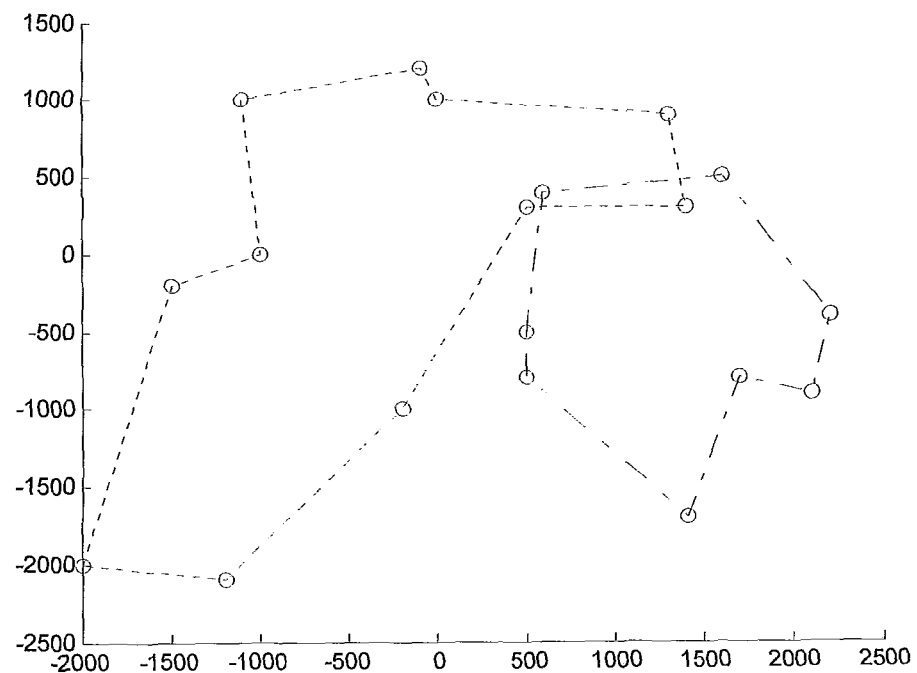

Consider the situation depicted in FIG. 13a with two overlapping cell polygons. In order to describe the details of the invention, it is assumed that all computations are performed in a 2-dimensional Cartesian earth tangential coordinate system. In this coordinate system, the corners of the two polygons to be fused (merged) are represented as:

$$r_i^1 = (x_i^1 y_i^1)^T, i=1,\ldots,N^1 \quad (1)$$

$$r_i^2 = (x_i^2 y_i^2)^T, i=1,\ldots,N^2. \quad (2)$$

Determination if Polygons Overlap or Not
Three cases need to be distinguished:
1) No intersections exist between line segments of the two polygons, and one polygon is completely in the interior of the other polygon.
2) No intersections between line segments of the two polygons exist and none of the corners of any of the two polygons are in the interior of the other polygon. Polygons are disjoint.
3) Intersections between the line segments of the two polygons exist. This is a case of overlapping polygons. There are two sub cases, where at least one corner of one of the polygon is in the interior of the other polygon, and where there is no such corner.

This is merely another way of stating that polygons can be either overlapping (including enclosed and intersecting polygons) or disjoint.

Search for Interior Points
This search is performed with an algorithm known from prior art. The application of the algorithm to polygon corners is probably not known from prior art, though. The test exploits a test ray from the tested polygon corner to infinity parallel to the east axis of the coordinate system. The test is based on the fact that for tested polygon corners in the interior of the other polygon, the other polygon must be intersected an odd number of times, when a point on the test ray moves from the tested corner to infinity. Formally, an assumption that the polygon is compact (finite) is also needed. The crossings with the other polygon boundary are easily determined by checking for intersections between the test ray, and the line segments between two adjacent other polygon corner points.

In the algorithm (4) below, it is tested if the corner points of polygon 1 are in the interior of polygon 2. The procedure for the reverse problem where the corners of polygon 2 are tested with regard to polygon 1 is identical, and is not reproduced here. (The code in the Annex contains both cases). The algorithm described below assumes that the first and last other polygon corner points are the same (duplicated). For this reason (1) and (2) are augmented with $r_{N^1+1}^1 = r_1^1$ and $r_{N^1+1}^2 = r_1^2$. To explain the algorithm, the intersection between the horizontal ray $y = y_i^1$, $x \geq x_i^1$ $y = y_0$, $x \geq x_0$, $i=1,\ldots,N^1$ and the line segment between the corners with index j and j+1 of the other cell polygon, is given by the solution (if it exists) to the equation $$\begin{pmatrix} x \\ y_i^1 \end{pmatrix} = \alpha \begin{pmatrix} x_{j+1}^2 \\ y_{j+1}^2 \end{pmatrix} + (1-\alpha) \begin{pmatrix} x_j^2 \\ y_j^2 \end{pmatrix}, x \geq x_i^1, 0 \leq \alpha < 1. \quad (3)$$

The solution to this equation, with consideration of the two constraints, renders an intersection if it exists. Repetition of this procedure for all line segments between corners of the other polygon hence allows for a count of the number of intersections for one specific tested polygon corner point. The complete procedure is summarized by the following algorithm, where $I_i^1 I_k$ denotes the number of intersections for tested polygon corner point $i^k$, and where $inside_i^1 inside_k$ is a Boolean that is true if tested polygon corner point with index $i^k$ is in the interior of the other polygon. The superscript indicate corners of polygon 1, the superscript 2 means corners of polygon 2,

```
for i = 1 to N¹                                          (4)
    I_i¹ = 0
    for j = 1 to N²
        if y_{j+1}² = y_j² - modify if segment is horizontal
            y_{i+1}² = y_i² + 0.01
        end α_{i,j} = (y_i¹ - y_j²) / (y_{j+1}² - y_j²)

x̄ = x_j² + α_{i,j}(x_{j+1}² - x_j²)
        if (x̄ - x_i¹ > 0) and (0 ≤ α_{i,j} < 1) - check constraints
            I_i¹ = I_i¹ + 1
        end
    end
    if (I_i¹ mod 2 = 1) - Odd?
        inside_i¹ = 'true'
    end
end.
```

Again, the variables $inside_i^1$, $i=1, \ldots, N^1$ indicate if polygon corners of polygon 1 are in the interior of polygon 2. The solution of the reverse problem is similar and can be obtained by switching the polygons 1 and 2.

Figure 13B:
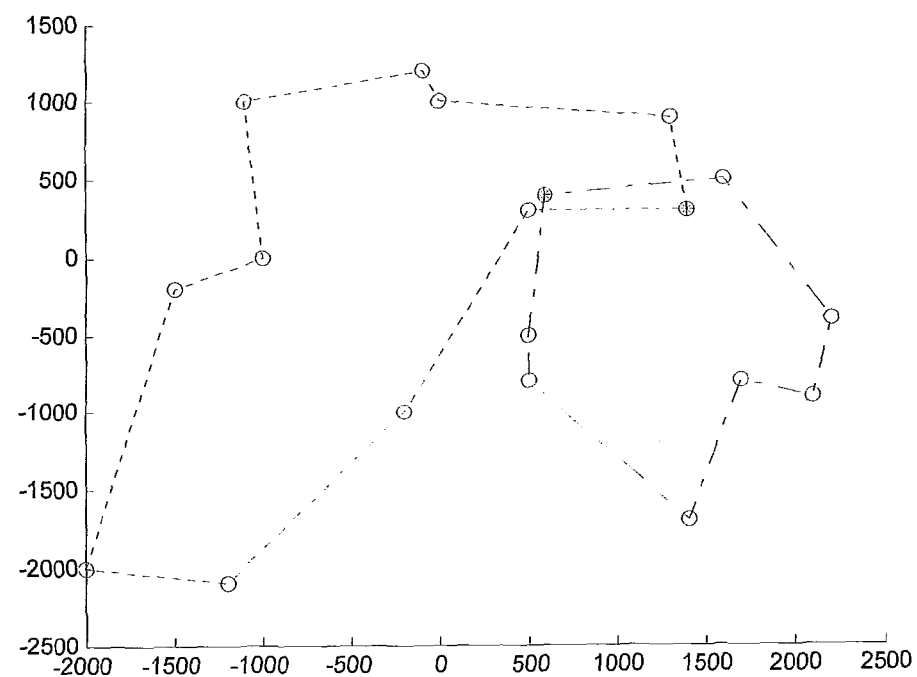
Figure 13C:
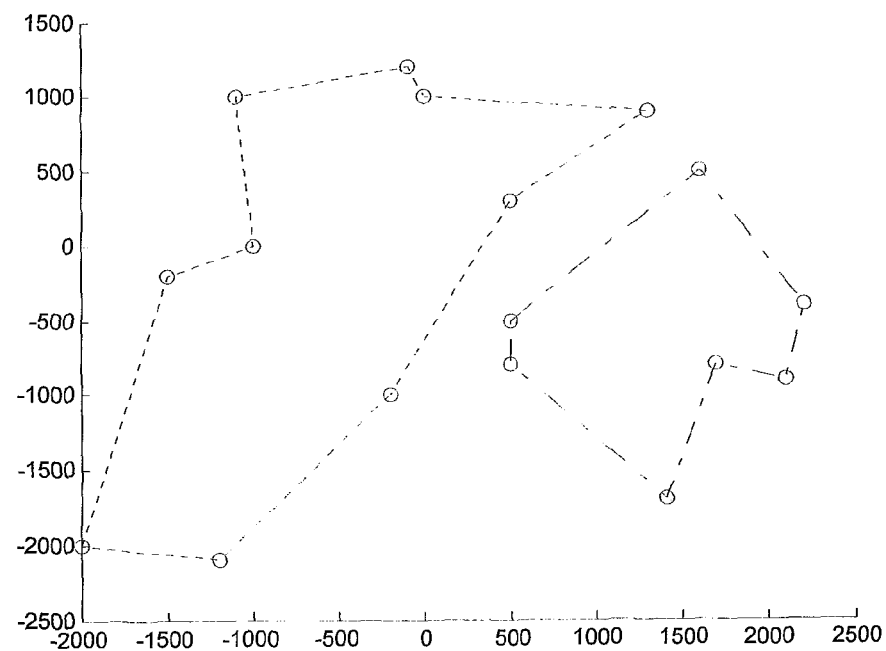

The effect of executing (4) for the example polygons is displayed in FIG. 13b. As can be seen, there is one corner of polygon 1 that is in the interior of polygon 2. There is also one corner of polygon 2 that is in the interior of polygon 1.

Search for Intersections

The next step, towards determination of which main case that applies, is to check for intersections between all line segments of the two polygons. It is again assumed that the polygons are extended so that the first and last corners coincide. It is now noted that arbitrary point on the line segments of the two polygons can be parameterized as $$r = r_i^1 + \gamma_i(r_{i+1}^1 - r_i^1), 0 \leq \gamma_i < 1 \quad (5)$$

$$r = r_j^2 + \kappa_j(r_{j+1}^2 - r_j^2), 0 \leq \kappa_j < 1. \quad (6)$$

Equating (5) and (6) and collecting terms leads to the systems of equations $$\begin{pmatrix} x_{i+1}^1 - x_i^1 & -(x_{j+1}^2 - x_j^2) \\ y_{i+1}^1 - y_i^1 & -(y_{j+1}^2 - y_j^2) \end{pmatrix} \begin{pmatrix} \gamma_{i,j} \\ \kappa_{i,j} \end{pmatrix} = \begin{pmatrix} x_j^2 - x_i^1 \\ y_j^2 - y_i^1 \end{pmatrix}, 0 \leq \gamma_i < 1, 0 \leq \kappa_j < 1 \quad (7)$$

$$r_{i,j}^{Intersection} = r_i^1 + \gamma_{i,j}(r_{i+1}^1 - r_i^1). \quad (8)$$

The following loop then checks if there are any intersections between the polygons

```
numberOfIntersections = 0
intersectionPoints(i,j) = (0)
for i = 1 to N¹
    for j = 1 to N²
        intersectionPoints(i,j) = (0)
        if (0 ≤ γ_i < 1) and (0 ≤ κ_j < 1)
            intersectionPoints(i,j) = (r_{i,j}^{Intersection})
            numberOfIntersections = numberOfIntersections + 1
        end
    end
end
if numberOfIntersections > 0
    intersections = 'true'
end                                                      (9)
```

Determination of Main Case

The case can now be determined as follows,

```
if any(insert_i¹ ='true') and (numberOfIntersections = 0)
    case = 1 - polygon 1 completely in the interior of polygon 2
    Report polygon 2
end
elseif any(insert_j² ='true') and (numberOfIntersections = 0)
    case = 1 - polygon 2 completely in the interior of polygon 1
    Report polygon 1
end
elseif (numberOfIntersections > 0)
    case = 3 - polygon 1 and polygon 2 overlap
    Proceed with processing of overlapping polygons
end
elseif all(insert_i¹ ='false') and all(insert_j² ='false') and
(numberOfIntersections = 0)
    case = 3 - polygon 1 and polygon 2 are disjoint
    Proceed with processing of disjoint polygons
end.                                                    (10)
```

Overlapping Polygons
Determination and Removal of Interior Points

The first step is to run the algorithm (4) two times to generate the variables $inside_i^1$, $i=1, \ldots, N^1$, and $inside_j^2$, $j=1, \ldots, N^2$, this may already have been done when determining the main case above. However, this is not necessarily true in case alternative embodiments are considered. The next step is then to remove the points that are in the interior according to the above variables. This generates the processed polygons $$r_i^{1,Step1} = (x_i^{1,Step1} y_i^{1,Step1})^T, i=1, \ldots, N^{1,Step1} \quad (11)$$

$$r_i^{2,Step1} = (x_i^{2,Step1} y_i^{2,Step1})^T, i=1, \ldots, N^{2,Step1}, \quad (12)$$

where the superscript $(\ )^{Step1}$ indicates that the polygon has been modified by a first processing step. In the removal process, it is required that special attention is given to corners 1 and $N^1$ of polygon 1, as well as to corners 1 and $N^2$ of polygon 2. If any of these are removed in one of the polygons, also the identical corner of that polygon needs to be removed. Furthermore, in this case also the resulting first new corner need to be added as a last corner, since the polygons are required to have a last corner that coincides with the first corner in order for all algorithms to work, cf. the discussion on polygon augmentation above. The effect of the resulting disjoint polygons is displayed in FIG. 13c.

Determination of Intersections Between Polygons and Merging of Polygons

The intersections between the polygons are then computed with the algorithm (9). In case of no intersections, the algorithm proceeds by merging of disjoint polygons. Otherwise, the following algorithm is applied.

First the dynamic variable polygonFinal is initialized with the first corner of one of the polygons, here polygon 1 is selected (MATLAB notation)

$$polygonFinal = \lfloor r_1^{1,Step1} \rfloor. \quad (13)$$

Following this the first polygon is traversed counterclockwise and corners of polygon 1 are added to polygonFinal until an intersection is encountered. Intersections are found by checking if (cf. (9))

$$intersectionPoints(i,j) \neq (0). \quad (14)$$

If (14) holds, then the stored intersection point is added to polygonFinal, and the addition of points is switched to follow polygon 2. Since there are no interior points this ensures that polygon corners are added along a joint boundary of both polygons. This proceeds until a new intersection occurs, at which the intersection point is added to polygonFinal and the search for new corners is switched back to Polygon 1. The procedure ends after addition of $r_{N^1+1}{}^1$, i.e. when the procedure returns to the corner where it started.

Accuracy Preserving Removal of Polygon Corners of the End Result

Sometimes, the resulting polygonFinal contains more corner points than 15. The number of corners then needs to be reduced. In order to do this, while minimizing the accuracy impairment, the summed distance of each corner to its two neighbours are computed. The corner with the smallest summed distance is then removed. If the number of corners are still too large, the procedure is repeated for the remaining corners, until the number of corners of polygonFinal is sufficiently small.

An Alternative Embodiment

The above technology may be combined differently in alternative embodiments. One particularly attractive possibility in the case with overlapping polygons would be to 1. Determine which corner points of polygon 1 and polygon 2 that are interior points to the other polygon.

2. Select a corner point that is NOT an interior point, as the first corner added to polygonFinal.

3. Adding corner points to polygonFinal as disclosed above.

Some consideration then shows that any interior points will be automatically excluded from polygonFinal since the addition of corner points always will follow the outer of the two polygons. Hence, this avoids the need to remove any interior points before the build up of polygonFinal starts.

Disjoint Polygons

Determination of Closest Corners

Since the polygons are disjoint, they need to be connected in a way that preferably minimizes the added area to polygonFinal. One way to do this is to connect corners of the two polygons that are "close". The embodiment described here therefore starts by searching for the corners of polygon 1 and polygon 2 that are the closest, i.e. by solving $$i_{min}, j_{min} = \underset{i,j}{\operatorname{argmin}} \|r_i^{1,Step1} - r_j^{2,Step1}\|. \quad (15)$$

Since the number of corners is at most 15 in each polygon, this problem is solved by a trivial search over all corners, see the Annex for details.

Determination of Another Best Corner to Connect

The above equation (15) determines a first line segment that, when added, provides the first of two new line segments needed to merge polygon 1 and polygon 2. Two more points, one on each polygon, need to be determined to complete the merging procedure. To determine such a pair of points, a search of points on both polygons is executed, going outwards from the minimizing points of (15). The search determines the pair of points that 1. Defines a line segment which does not intersect the line segment defined by (15).

2. Are closest to each other.

When executing the search, special care needs to be taken to the possibility of a wrap around at polygon corners with numbers 1, $N^{1,Step1}$ and 1, $N^{2,Step1}$. The result obtained for the polygons 1 and 2 of the example is shown in FIG. 13d.

Removal of Interior Arcs of PolygonFinal

Figure 13D:
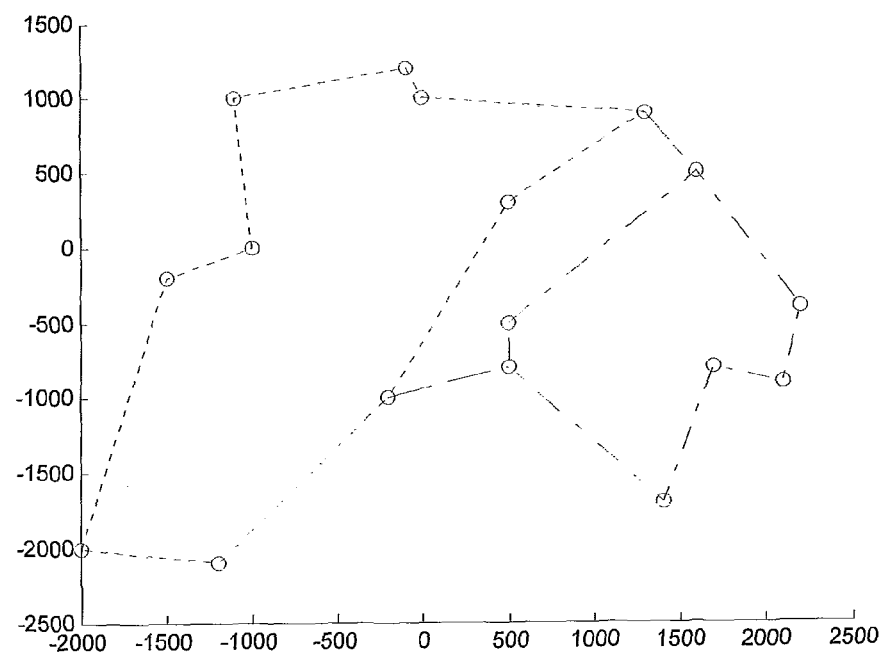
Figure 13E:
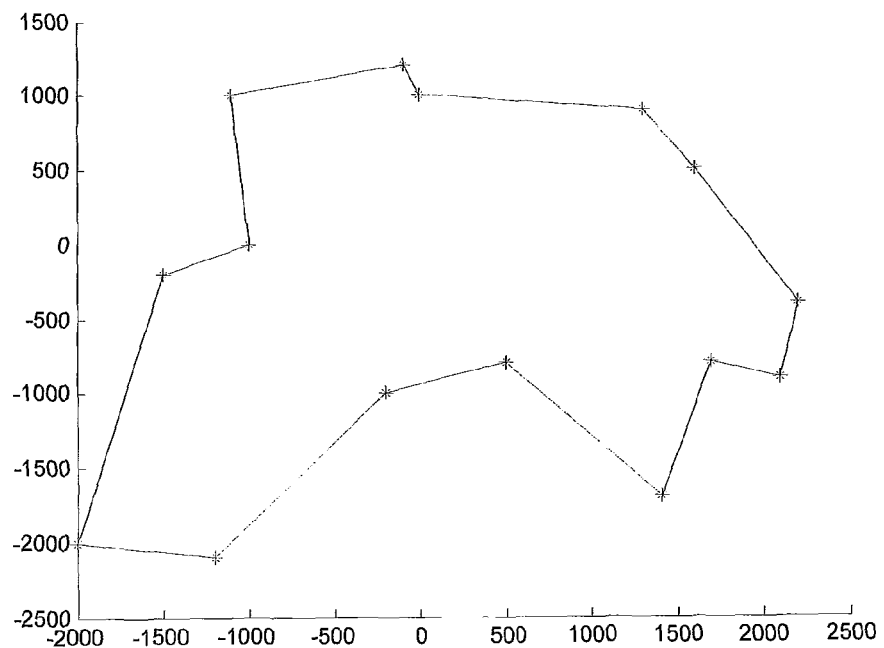
Figure 13F:
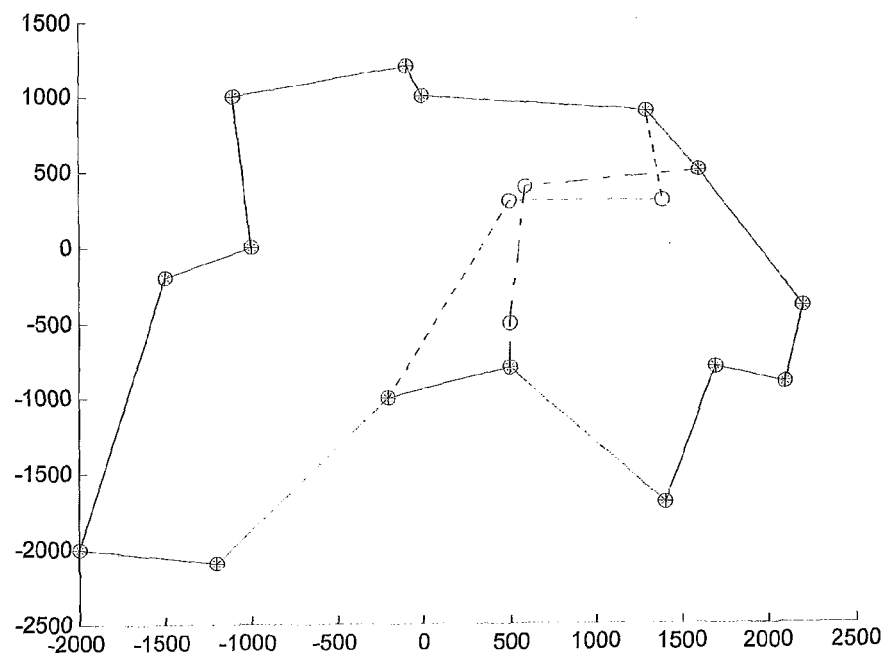

As is evident from FIG. 13d, the line segments that are interior to polygonFinal need to be removed. This is straightforward since the corner indices are known for each of the corner points for the line segments added to polygonFinal in the previous subsections. The algorithm can hence directly remove the corner points corresponding to corner point number in between. Again, it is important to keep track of any wrap around in the polygon corner numbering. The result obtained for the polygons 1 and 2 of the example is shown in FIG. 13e.

Accuracy Preserving Removal of Polygon Corners of the End Result

Sometimes, the resulting polygonFinal contains more corner points than 15. The number of corners then needs to be reduced. In order to do this, while minimizing the accuracy impairment, the summed distance of each corner to is two neighbours are computed. The corner with the smallest summed distance is then removed. If the number of corners is still too large, the procedure is repeated for the remaining corners, until the number of corners of polygonFinal is sufficiently small.

Figure 14:
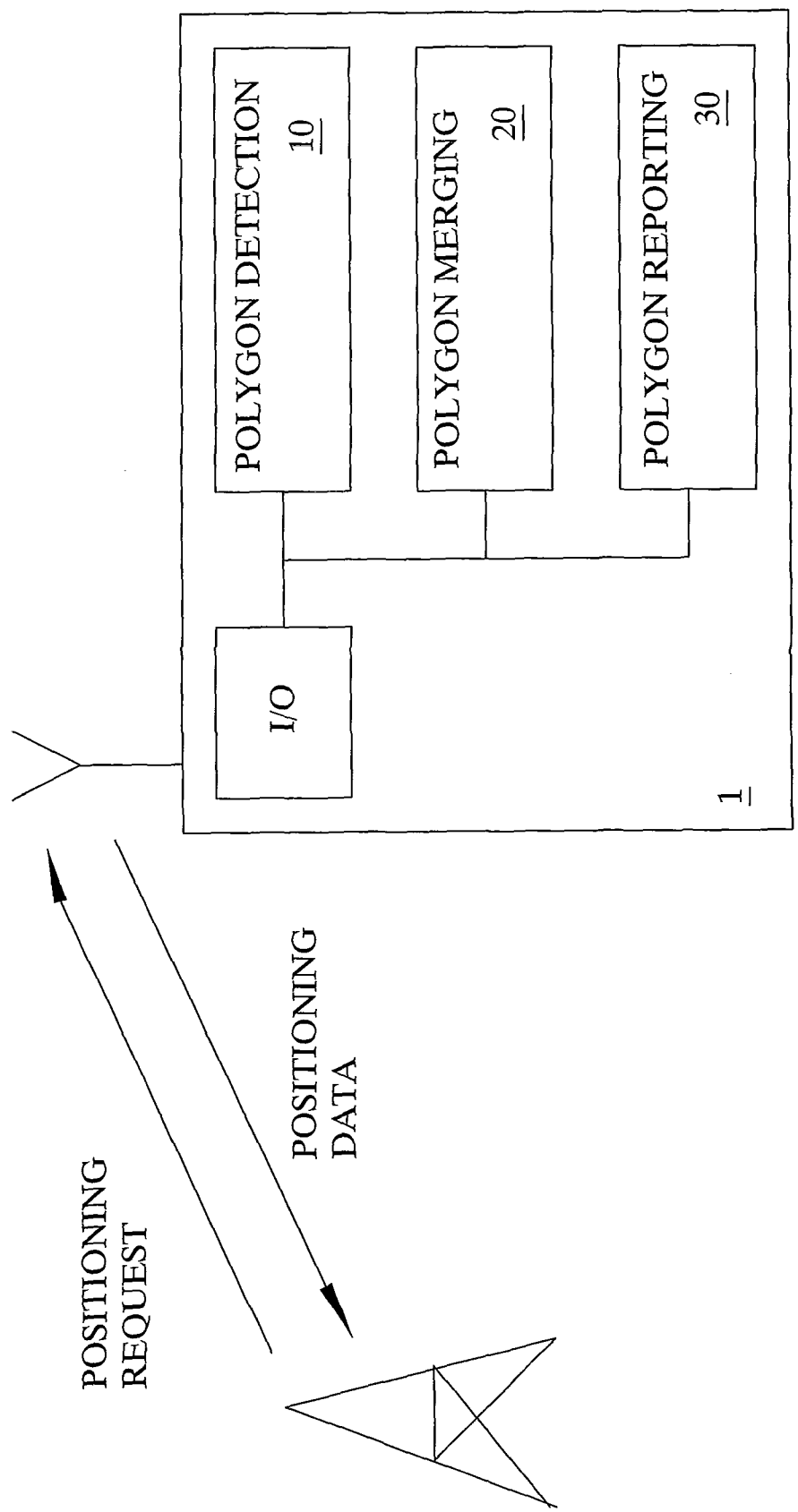
FIG. 14 is an illustration of an embodiment of an arrangement according to the present invention.

With reference to FIG. 14, an embodiment of an arrangement according to the present invention will be described. The illustration shows an arrangement according to the present invention in communication with a radio base station and exchanging positioning requests and positioning data.

An embodiment of an arrangement 1 for enabling improved reporting of high precision position determination data in a cellular communication system is configured as described below. The arrangement is typically located in a user terminal, but could potentially be located in some other node or distributed between a plurality of nodes in the communication system. The arrangement 1 comprises a generic input/output unit I/O and other functionalities (not shown) for receiving and transmitting data according to known methods. In addition, the arrangement 1 includes a polygon detection unit 10, which is adapted to be responsive to positioning requests and detecting two different cell polygons, each representative of a geographical location of a respective cluster of high precision position determinations. Although the description is aimed at two polygons, it is equally possible to further adapt the arrangement to handle multiple polygons. In addition, the arrangement 1 includes a merging or joining unit 20 configured for joining the two cell polygons to form a merged cell polygon. The joining unit 1 is configured to join the polygons by selectively joining a respective outer perimeter of each polygon in order to minimize a resulting merged cell polygon area and maintaining the number of corners of said merged cell polygon below a predetermined threshold. Finally, the arrangement comprises reporting means 30 for reporting the merged cell polygon to a network node, thereby providing position determination data originating from two different cell polygons as a single merged cell polygon.

The methods and arrangements according to the present invention can be implemented by hardware or software means Advantages of the invention enables enhancing the performance of the AECID fingerprinting positioning algorithm, in situations where the underlying clusters of reference positions are organized in disjoint parts. In such cases previously disclosed cluster splitting algorithms can be applied, to automatically split said cluster in sub-clusters. Polygons can then be computed by the previously disclosed contracting polygon algorithm [3], individually for each sub-cluster. Another major advantage by the invention is that without it, it is not possible to report the result of the positioning from the positioning node to the end user—this being caused that one polygon is reported for each positioning request, both in the WCDMA and the LTE cellular systems.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] 3GPP, TS 23.032, "Universal Geographical Area Description (GAD)," available at http://www.3gpp.org.
[2] 3GPP, TS25.413, "UTRAN Iu interface RANAP signalling", available at http://www.3gpp.org.
[3] T. Wigren, "Adaptive enhanced cell-ID fingerprinting positioning by clustering of precise position measurements", IEEE Trans. Vehicular Tech., vol. 56, no. 5, 2007.
[4] T. Wigren, P22287 (PCT), Extended clustering, International patent application.

ANNEX

```
%
% Polygon merging
%

%
% Set up polygons
% polygon1=[
    -2000 -2000;
    -1500 -200;
    -1000 0;
    -1100 1000;
    -100 1200;
    0 1000;
    1300 900;
    1400 300;
    500 300;
    -200 -1000;
    -1200 -2100;
    -2000 -2000];
N1=size(polygon1,1);

polygon2=[
    1000 -1000;
    1100 -100;
    2100 0;
    2700 -900;
    2600 -1400;
    2200 -1300;
    1900 -2200;
    1000 -1300;
    1000 -1000;
    ];
N2=size(polygon2,1);

%
% Translate polygons
% polygon2(:,1) = polygon2(:,1)+0.001-499;
polygon2(:,2) = polygon2(:,2)+0.001+499;
```

```
%
% Plot overlapping polygons
% figure;
hold on
plot(polygon1(:,1), polygon1(:,2),'g');
plot(polygon1(:,1), polygon1(:,2),'og');
plot(polygon2(:,1), polygon2(:,2),'b');
plot(polygon2(:,1), polygon2(:,2),'ob');

%
% Find corners of second polygon that are in the interior of the first
% polygon. This is necessary since the intersection iteration cannot be
% allowed to start in an interior point.
% secondPolygonIsInside = zeros(N2,1);
firstPolygonIsInside = zeros(N1,1);
for j=1:N2-1 % Loop over the corners of the second polygon
    X(1,1) = polygon2(j,1);
    Y(1,1) = polygon2(j,2);
    numberOfCrossings = 0;
    for i=1:N1-1 % Loop over all line segments of the first polygon
        if (polygon1(i+1,2) == polygon1(i,2)) % Horizontal --> parallell problem!
            polygon1(i+1,2) = polygon1(i+1,2)+0.01; % Adjust slightly to avoid division by zero
        end
        alpha = (Y(1,1)-polygon1(i,2))/(polygon1(i+1,2)-polygon1(i,2)); % Parameter for intersection calculation
        beta = polygon1(i,1)-X(1,1)+alpha*(polygon1(i+1,1)-polygon1(i,1)); % Parameter for intersection calculation
        if ( (beta > 0) & (alpha < 1) & (alpha >= 0) ) % Condition testing if the tentative intersection i) is to the right of the test point (positive horizontal test ray) and ii) is on the line segment conencting points i and i+1 of polygon 1
            numberOfCrossings = numberOfCrossings +1 ;
        end
    end
```

```
%
% All line segmenst have now been tested for intersections with the
% test ray. The test point must be an interior point of the polygon if
% the number of crossings is odd - the polygon is
% bounded, hence if the test ray would pass from outside and in, then it
% must also leave the polygon, hence for exterior points the
% number of crossing must always be even
% if (mod(numberOfCrossings,2) == 1) % Test point is inside polygon
        secondPolygonIsInside(j,1) = 1;
    else
        secondPolygonIsInside(j,1) = 0;
    end
end % End of loop %
% Find corners of first polygon that are in the interior of the second
% polygon. This is necessary since the intersection iteration cannot be
% allowed to start in an interior point
% for j=1:N1-1 % Loop over the corners of the first polygon
    X(1,1) = polygon1(j,1);
    Y(1,1) = polygon1(j,2);
    numberOfCrossings = 0;
    for i=1:N2-1 % Loop over all line segments of the second polygon
        if (polygon2(i+1,2) == polygon2(i,2)) % Horizontal --> parallell problem!
            polygon2(i+1,2) = polygon2(i+1,2)+0.01; % Adjust slightly to avoid division by zero
        end
        alpha = (Y(1,1)-polygon2(i,2))/(polygon2(i+1,2)-polygon2(i,2)); % Parameter for intersection calculation
        beta = polygon2(i,1)-X(1,1)+alpha*(polygon2(i+1,1)-polygon2(i,1)); % Parameter for intersection calculation
        if ( (beta > 0) & (alpha < 1) & (alpha >= 0) ) % Comdition testing if the tentative intersection i) is to the right of the test point (positive horizontal test ray) and ii) is on the line segment conencting points i and i+1 of polygon 1
            numberOfCrossings = numberOfCrossings +1 ;
        end
    end
```

```
%
% All line segmenst have now been tested for intersections with the
% test ray. The test point must be an interior point of the polygon if
% the number of crossings is odd - the polygon is
% bounded, hence if the test ray would pass from outside and in, then it
% must also leave the polygon, hence for exterior points the
% number of crossing must always be even
% if (mod(numberOfCrossings,2) == 1) % Test point is inside polygon
        firstPolygonIsInside(j,1) = 1;
    else
        firstPolygonIsInside(j,1) = 0;
    end
end % End of loop %
% Plot
% figure;
hold on
plot(polygon1(:,1), polygon1(:,2),'g');
plot(polygon1(:,1), polygon1(:,2),'og');
plot(polygon2(:,1), polygon2(:,2),'b');
plot(polygon2(:,1), polygon2(:,2),'ob');
for j=1:N2
    if (secondPolygonIsInside(j,1) == 1)
        plot(polygon2(j,1),polygon2(j,2),'*g')
    end
end
for j=1:N1
    if (firstPolygonIsInside(j,1) == 1)
        plot(polygon1(j,1),polygon1(j,2),'*b')
    end
end %
% End plot
%

%
```

```
% Then compute the polygons with removed interior points. The variable exit
% keeps track of the case where all corners of a polygon is in the interior
% of the other.
% exit = 0;
polygon1Step1 = [];
polygon2Step1 = [];
for j=1:N1-1
    if (firstPolygonIsInside(j,1) == 0)
        polygon1Step1 = [polygon1Step1; polygon1(j,:)];
    end
end
if (size(polygon1Step1,1) == 0)
    exit = 1;
    polygonFinal = polygon2;
end
if (~exit)
    if (firstPolygonIsInside(1,1) == 1) % Need to add last corner to the
first since the first is gone
        polygon1Step1       =       [polygon1Step1(size(polygon1Step1,1),:);
polygon1Step1];
    else
        polygon1Step1 = [polygon1Step1; polygon1(N1,:)];
    end
    N1Step1 = size(polygon1Step1,1);
end
if (~exit)
    for j=1:N2-1
        if (secondPolygonIsInside(j,1) == 0)
            polygon2Step1 = [polygon2Step1; polygon2(j,:)];
        end
    end
    if (size(polygon2Step1,1) == 0)
        exit = 1;
        polygonFinal = polygon1;
    end
    if (~exit)
        if (secondPolygonIsInside(1,1) == 1) % Need to add last corner to
the first since the first is gone
            polygon2Step1       =       [polygon2Step1(size(polygon2Step1,1),:);
polygon2Step1];
        else
            polygon2Step1 = [polygon2Step1; polygon2(N2,:)];
        end
```

```
        N2Step1 = size(polygon2Step1,1);
    end
end

%
% Plot with removed interior points
% figure;
hold on
if (~exit)
    plot(polygon1Step1(:,1), polygon1Step1(:,2),'g');
    plot(polygon1Step1(:,1), polygon1Step1(:,2),'og');
    plot(polygon2Step1(:,1), polygon2Step1(:,2),'b');
    plot(polygon2Step1(:,1), polygon2Step1(:,2),'ob');
else
    plot(polygonFinal(:,1),polygonFinal(:,2),'k');
    plot(polygonFinal(:,1),polygonFinal(:,2),'ok');
end %
% Then determine if there is overlap between polygons. There are three
cases, of which one has been covered :
% i) Intersections exist.
% ii) One polygon is completely in the interior of the other. Then there
are
% no intersections, and all corners are in the interior. This is an exit
% condition since the polygonXStep1 is empty...
% iii) No intersections exist - disjoint polygons
%

%
% Intersections are searched for, by solving systems of equations
% if (~exit)
    intersections = zeros(N1Step1-1,N2Step1-1);
    intersectionPoints = [];
    numberOfIntersections = 0;
    for i=1:N1Step1-1
        for j=1:N2Step1-1
```

```
            LHS    =    [polygon1Step1(i+1,1)-polygon1Step1(i,1)    -
(polygon2Step1(j+1,1)-polygon2Step1(j,1));        polygon1Step1(i+1,2)-
polygon1Step1(i,2) -(polygon2Step1(j+1,2)-polygon2Step1(j,2))];
            RHS    =         [polygon2Step1(j,1)-polygon1Step1(i,1);
polygon2Step1(j,2)-polygon1Step1(i,2)];
            gamma = inv(LHS)*RHS;
            if   (  (gamma(1,1)>0)  &  (gamma(1,1)<=1)  &  (gamma(2,1)>0)  &
(gamma(2,1)<=1) )
                intersections(i,j) = 1;
                numberOfIntersections = numberOfIntersections + 1;
                intersectionPoints    =    [intersectionPoints;   i   j   gamma'
polygon1Step1(i,1)+gamma(1,1)*(polygon1Step1(i+1,1)-polygon1Step1(i,1))
polygon1Step1(i,2)+gamma(1,1)*(polygon1Step1(i+1,2)-polygon1Step1(i,2))];
            end
        end
    end
end %
% Then determine if this is case i) or ii)
% if ~(exit)
    disjoint = 0;
    if (numberOfIntersections == 0)
        disjoint = 1;
    end
end if ((~exit) & (~disjoint))

%
% Move around polygon 1 and add corners to polygonFinal. When an
intersection occurrs, add the intersection
% point to the polygon and continue moving around polygon 2, adding
corners. When the next
% intersection is encountered, add the intersection point and continue
% moving along polygon 1, adding corners. Since there are no interior
points, this secures
% that the movement is always along the union of the two polygons.
% around = 0;
    i = 0;
    j = 0;
```

```
currentPolygon = 1;
polygonFinal = [];
intersectionsAdded = 0;
while (~around)
    if (currentPolygon == 1)
        i = i+1;
        polygonFinal = [polygonFinal; polygon1Step1(i,:)];
        currentIntersectionPointIndices = find(intersectionPoints(:,1) == i);
        if (size(currentIntersectionPointIndices,1)>0)   % Add intersection point, switch to polygon 2 and select new index for that polygon, then remove from list by setting index to 0 0
            [dummy,index] = min(intersectionPoints(currentIntersectionPointIndices,3));
            polygonFinal = [polygonFinal; intersectionPoints(currentIntersectionPointIndices(index),5:6)];   % Update polygon
            j = intersectionPoints(currentIntersectionPointIndices(index),2);   % The next point for polygon 2
            intersectionPoints(currentIntersectionPointIndices(index),1:2) = [0 0];
            currentPolygon = 2;
        end
        if (i==N1Step1)
            around = 1;   % Done!
        end
    end
    if (currentPolygon == 2)
        j = j+1;
        if (j==N2Step1)   % Handle wrap around
            j = 1;
        end
        polygonFinal = [polygonFinal; polygon2Step1(j,:)];
        currentIntersectionPointIndices = find(intersectionPoints(:,2) == j);
        if (size(currentIntersectionPointIndices,1)>0)   % Add intersection point, switch to polygon 1 and select new index for that polygon, then remove from list by setting index to 0 0
            [dummy,index] = min(intersectionPoints(currentIntersectionPointIndices,4));
            polygonFinal = [polygonFinal; intersectionPoints(currentIntersectionPointIndices(index),5:6)];   % Update polygon
```

```
               i                                                    =
intersectionPoints(currentIntersectionPointIndices(index),1);  %  The  next
point for polygon 1 intersectionPoints(currentIntersectionPointIndices(index),1:2) = [0 0];
            currentPolygon = 1;
         end
      end
   end
end %
%radfhis, these corners are connected, after which
% adjacent corners are connected.
% if ((~exit) & (disjoint))
   closestPolygon1Corner = 1;
   closestPolygon2Corner = 1;
   currentDistance = 1e8; % Something large
   for i=1:N1Step1-1
      for j=1:N2Step1-1
         thisDistance = sqrt( (polygon1Step1(i,1)-polygon2Step1(j,1))^2
+ (polygon1Step1(i,2)-polygon2Step1(j,2))^2 );
         if (thisDistance < currentDistance)
            closestPolygon1Corner = i;
            closestPolygon2Corner = j;
            currentDistance = thisDistance;
         end
      end
   end %
   % Since clusters are disjoint,it is likely that when connecting
   % adjacent corners, one should step clockwise for one cluster and
   % counterclockwise for the other cluster. This is not sure though,
   % hence a search is performed and intersections checked.
   % currentDistance = 1e8; % Initialization to something large
   currentStep1 = 1;
   currentStep2 = 1;
   maxIterations = max([min([floor(N1Step1/2)-1 floor(N2Step1/2)-1])],1);
   for i=-maxIterations:1:maxIterations
      for j=-maxIterations:1:maxIterations
```

```
            if ((i~=0) & (j~=0))
                    additionalPolygon1CornerToConnect               =
closestPolygon1Corner+i;
                    additionalPolygon2CornerToConnect               =
closestPolygon2Corner+j;
                if (additionalPolygon1CornerToConnect<1)
                    additionalPolygon1CornerToConnect               =
additionalPolygon1CornerToConnect+N1Step1-1;
                end
                if (additionalPolygon1CornerToConnect>=N1Step1)
                    additionalPolygon1CornerToConnect = 1;
                end
                if (additionalPolygon2CornerToConnect<1)
                    additionalPolygon2CornerToConnect               =
additionalPolygon2CornerToConnect+N2Step1-1;
                end
                if (additionalPolygon2CornerToConnect>=N2Step1)
                    additionalPolygon2CornerToConnect = 1;
                end additionalCorner1                                   =
polygon1Step1(additionalPolygon1CornerToConnect,:);
                additionalCorner2                                   =
polygon2Step1(additionalPolygon2CornerToConnect,:);
                thisDistance       =       sqrt(    (additionalCorner1(1,1)-
additionalCorner2(1,1))^2          +         (additionalCorner1(1,2)-
additionalCorner2(1,2))^2);

%
                % Check for intersection
                %

LHS        =        [polygon1Step1(closestPolygon1Corner,1)-
polygon2Step1(closestPolygon2Corner,1)            -(additionalCorner1(1,1)-
additionalCorner2(1,1));             polygon1Step1(closestPolygon1Corner,2)-
polygon2Step1(closestPolygon2Corner,2)            -(additionalCorner1(1,2)-
additionalCorner2(1,2))];
                RHS        =        [additionalCorner2(1,1)-polygon2Step1(1,1);
additionalCorner2(1,2)-polygon2Step1(1,2)];
                kappa = inv(LHS)*RHS;
                if ~( (kappa(1,1)>0) & (kappa(1,1)<=1) & (kappa(2,1)>0) &
(kappa(2,1)<=1) ) % OK
                    if (thisDistance < currentDistance)
                        bestAdditionalPolygon1CornerToConnect           =
additionalPolygon1CornerToConnect;
```

```
                    bestAdditionalPolygon2CornerToConnect        =
additionalPolygon2CornerToConnect;
                    currentDistance = thisDistance;
                    currentStep1 = i;
                    currentStep2 = j;
                end
            end
        end
    end
end %
% Plot combining
% figure
hold on
plot(polygon1Step1(:,1),polygon1Step1(:,2),'g');
plot(polygon1Step1(:,1),polygon1Step1(:,2),'og');
plot(polygon2Step1(:,1),polygon2Step1(:,2),'b');
plot(polygon2Step1(:,1),polygon2Step1(:,2),'ob');

plot([polygon1Step1(closestPolygon1Corner,1);polygon2Step1(closestPolygon2C
orner,1)],[polygon1Step1(closestPolygon1Corner,2);polygon2Step1(closestPoly
gon2Corner,2)],'r');

plot([polygon1Step1(bestAdditionalPolygon1CornerToConnect,1);polygon2Step1(
bestAdditionalPolygon2CornerToConnect,1)],[polygon1Step1(bestAdditionalPoly
gon1CornerToConnect,2);polygon2Step1(bestAdditionalPolygon2CornerToConnect,
2)],'r');

%
% End of plot
%

%
% Now closestPolygon1Corner shall be connected to
% closestPolygon2Corner, and bestAdditionalPolygon1CornerToConnect
% shall be connected to bestAdditionalPolygon2CornerToConnect. The
% corners in between shall be removed from polygonfinal.
% steppingPolygon1 = 1;
steppingPolygon2 = 0;
addedCorners1 = 0;
```

```
addedCorners2 = 0;
polygonFinal = [];
ready = 0;
while (~ready)
    if (steppingPolygon1)
        addedCorners1 = addedCorners1+1;
        polygonFinal = [polygonFinal; polygon1Step1(addedCorners1,:)];
        if (addedCorners1 == closestPolygon1Corner)
            steppingPolygon1 = 0;
            steppingPolygon2 = 1;
            addedCorners2 = closestPolygon2Corner;
            polygonFinal               =              [polygonFinal;
polygon2Step1(addedCorners2,:)]
        end
        if (addedCorners1 == N1Step1)
            if (1 == closestPolygon1Corner)
                steppingPolygon1 = 0;
                steppingPolygon2 = 1;
                addedCorners2 = closestPolygon2Corner;
                polygonFinal               =              [polygonFinal;
polygon2Step1(addedCorners2,:)]
            end
        end
        if (addedCorners1 == bestAdditionalPolygon1CornerToConnect)
            steppingPolygon1 = 0;
            steppingPolygon2 = 1;
            addedCorners2 = bestAdditionalPolygon2CornerToConnect;
            polygonFinal               =              [polygonFinal;
polygon2Step1(addedCorners2,:)]
        end
        if (addedCorners1 == N1Step1)
            if (1 == bestAdditionalPolygon1CornerToConnect)
                steppingPolygon1 = 0;
                steppingPolygon2 = 1;
                addedCorners2 = bestAdditionalPolygon2CornerToConnect;
                polygonFinal               =              [polygonFinal;
polygon2Step1(addedCorners2,:)]
            end
        end
    end
    if (steppingPolygon2)
        addedCorners2 = addedCorners2+1;
        polygonFinal = [polygonFinal; polygon2Step1(addedCorners2,:)];

if (addedCorners2 == closestPolygon2Corner)
```

```
            steppingPolygon1 = 1;
            steppingPolygon2 = 0;
            addedCorners1 = closestPolygon1Corner;
            polygonFinal                = [polygonFinal;
polygon1Step1(addedCorners1,:)]
        end
        if (addedCorners2 == N2Step1)
            if (1 == closestPolygon2Corner)
                steppingPolygon1 = 1;
                steppingPolygon2 = 0;
                addedCorners1 = closestPolygon1Corner;
                polygonFinal                = [polygonFinal;
polygon1Step1(addedCorners1,:)]
            end
        end
        if (addedCorners2 == bestAdditionalPolygon2CornerToConnect)
            steppingPolygon1 = 1;
            steppingPolygon2 = 0;
            addedCorners1 = bestAdditionalPolygon1CornerToConnect;
            polygonFinal                = [polygonFinal;
polygon1Step1(addedCorners1,:)]
        end
        if (addedCorners2 == N2Step1)
            if (1 == bestAdditionalPolygon2CornerToConnect)
                steppingPolygon1 = 1;
                steppingPolygon2 = 0;
                addedCorners1 = bestAdditionalPolygon1CornerToConnect;
                polygonFinal                = [polygonFinal;
polygon1Step1(addedCorners1,:)]
            end
        end end
    if (addedCorners1 == N1Step1)
        ready = 1;
    end
  end
end figure
hold on
plot(polygonFinal(:,1),polygonFinal(:,2),'k')
plot(polygonFinal(:,1),polygonFinal(:,2),'*k')

%
```

```
% In case the resulting final polygon has too many corners, corners are
% removed. To minimize overall effects, points are removed iteratively,
% starting to remove those which have the smallest distance to both of
% their neighbours.
%

NFinal = size(polygonFinal,1);
if (NFinal<=16)
    ready = 1;
else
    ready = 0;
end
while (~ready)
    currentCornerToRemove = 1;
    currentMinimumDistance       =       sqrt((polygonFinal(1,1)-
polygonFinal(2,1))^2+(polygonFinal(1,2)-polygonFinal(2,2))^2)        +
sqrt((polygonFinal(1,1)-polygonFinal(NFinal-1,1))^2+(polygonFinal(1,2)-
polygonFinal(NFinal-1,2))^2);
    for i=2:NFinal-1
        thisMinimumDistance      =       sqrt((polygonFinal(i,1)-
polygonFinal(i+1,1))^2+(polygonFinal(i,2)-polygonFinal(i+1,2))^2)    +
sqrt((polygonFinal(i,1)-polygonFinal(i-1,1))^2+(polygonFinal(i,2)-
polygonFinal(i-1,2))^2);
        if (thisMinimumDistance < currentMinimumDistance)
            currentCornerToRemove = i;
            currentMinimumDistance = thisMinimumDistance;
        end
    end % Remove the selected corner if ((currentCornerToRemove == 1) | (currentCornerToRemove == NFinal))
        polygonFinal = polygonFinal(2:NFinal,:);
        polygonFinal(NFinal,:) = polygonFinal(2,:);
        NFinal = NFinal-1;
        if (NFinal<=16)
            ready = 1; % Done
        end
    else
        newPolygonFinal = polygonFinal(1:currentCornerToRemove-1,:);
        newPolygonFinal            =            [newPolygonFinal;
polygonFinal(currentCornerToRemove+1:NFinal,:)];
        polygonFinal = newPolygonFinal;
        NFinal = NFinal-1;
        if (NFinal<=16)
```

```
            ready = 1; % Done
        end
    end
end

%
% Plot
% figure
hold on
plot(polygonFinal(:,1),polygonFinal(:,2),'k')
plot(polygon1(:,1),polygon1(:,2),'og');
plot(polygon1(:,1),polygon1(:,2),'g');
plot(polygon2(:,1),polygon2(:,2),'ob');
plot(polygon2(:,1),polygon2(:,2),'b');
plot(polygonFinal(:,1),polygonFinal(:,2),'ok')
```

The invention claimed is:

1. A method of enabling reporting of high precision position determination data in a cellular communication system, comprising:
   detecting two different cell polygons, each representative of a geographical location of a respective cluster of high precision position determinations in response to a positioning request;
   joining the two different cell polygons to form a merged cell polygon by selectively joining a respective outer perimeter of each of the polygons to minimize a resulting merged cell polygon area while maintaining a number of corners of the merged cell polygon below a predetermined threshold; and
   reporting the merged cell polygon to a network node to provide position determination data originating from the two different cell polygons as the single merged cell polygon.

2. The method according to claim 1, further comprising:
   computing polygons from clusters, the clusters being obtained by a cluster splitting algorithm.

3. The method according to claim 1, further comprising:
   computing polygons from clusters, the clusters being obtained from the use of repeaters, the repeaters generating disjoint regions comprising the high precision position determinations having a same tag.

4. The method according to claim 1, further comprising:
   determining if the two different cell polygons are geographically overlapping.

5. The method according to claim 4, further comprising responsive to the two different cell polygons geographically overlapping each other:
   determining if one of the two different cell polygons encloses the other one of the cell polygons; and
   determining if either of the cell polygons contains any interior points of the other one of the cell polygons.

6. The method according to claim 5, further comprising responsive to one of the two cell polygons enclosing the other one of the two cell polygons, the joining step comprising selecting the enclosing cell polygon to form the merged cell polygon.

7. The method according to claim 5, further comprising:
   removing any of the determined interior points to form two disjoint cell polygons; and wherein joining the two different cell polygons comprises joining the two disjoint cell polygons to form the merged cell polygon.

8. The method according to claim 5, further comprising:
   identifying two pairs of closest corners between the two disjoint cell polygons and joining the closest corners in each of the pairs such that an added area of the merged cell polygon is minimized.

9. The method according to claim 5, further comprising:
   identifying any intersection points between the two cell polygons; and wherein joining the two different cell polygons comprises:
   adding the intersection points as new corners; and
   forming a joint perimeter of the two cell polygons to form the merged cell polygon by means of a joint boundary of the two cell polygons.

10. The method according to claim 1, further comprising:
    determining if a number of corners of the merged polygon exceeds a predetermined threshold.

11. The method according to claim 10, further comprising:
    removing corners from the merged polygon until the threshold is met.

12. The method according to claim 11, further comprising:
    for each of the corners of the merged polygon, adding the distance to its two adjacent corners, and removing the corner with a smallest summed distance; and
    repeating adding the distance until the threshold is met.

13. An arrangement for enabling reporting of high precision position determination data in a cellular communication system, comprising:
    detecting means for detecting two different cell polygons, each representative of a geographical location of a respective cluster of high precision position determinations;
    merging means for joining the two different cell polygons to form a merged cell polygon by selectively joining a respective outer perimeter of each of the polygons to minimize a resulting merged cell polygon area while maintaining a number of corners of the merged cell polygon below a predetermined threshold; and
    reporting means for reporting the merged cell polygon to a network node to provide position determination data originating from the two different cell polygons as a single merged cell polygon.

* * * * *